(12) United States Patent
Pope

(10) Patent No.: US 6,439,112 B1
(45) Date of Patent: Aug. 27, 2002

(54) NEEDLE FOR FOOD ITEM INJECTION

(75) Inventor: Richard D Pope, Fayatteville, AR (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 09/605,156

(22) Filed: Jun. 28, 2000

(51) Int. Cl.$^7$ ............................. A22C 9/00; A23B 4/28
(52) U.S. Cl. ............................. 99/487; 99/532; 99/535
(58) Field of Search ..................... 99/532–536, 487; 604/187

(56) References Cited

U.S. PATENT DOCUMENTS

| | | | |
|---|---|---|---|
| 365,895 A | * 7/1887 | Bailey | |
| 2,544,316 A | 3/1951 | Higgins | 99/256 |
| 2,602,391 A | * 7/1952 | Pedranti et al. | 99/345 |
| 2,674,179 A | 4/1954 | Harrington | 99/257 |
| 2,796,017 A | 6/1957 | Scmidt | 99/256 |
| 3,035,508 A | 5/1962 | Nelson | 99/257 |
| 3,081,691 A | 3/1963 | Scmidt | 99/257 |
| 3,082,681 A | 3/1963 | Petersen | 99/257 |
| 3,334,570 A | 8/1967 | Nordin | 99/257 |
| 3,338,150 A | 8/1967 | Nordin | 99/257 |
| 3,381,603 A | 5/1968 | Jensen | 99/257 |
| 3,395,166 A | 7/1968 | Hoffmann | 99/257 |
| 3,428,000 A | 2/1969 | Gagnon | 107/1 |
| 3,718,083 A | 2/1973 | Walters | 99/532 |
| 3,779,151 A | 12/1973 | Ross | 99/533 |
| 3,917,088 A | 11/1975 | Visser | 214/130 R |
| 3,919,931 A | 11/1975 | Liljenburg | 99/533 |
| 4,314,386 A | 2/1982 | Easthope | 17/51 |
| 4,331,071 A | 5/1982 | Niccolls | 99/532 |
| 4,437,397 A | 3/1984 | Kawai | 99/533 |
| 4,459,928 A | 7/1984 | Eguchi | 112/268.1 |
| 5,507,221 A | 4/1996 | Lagares-Corominas | 99/532 |
| 5,913,968 A | 6/1999 | Thomas | 99/533 |

* cited by examiner

*Primary Examiner*—Keith Hendricks
*Assistant Examiner*—Drew Becker
(74) *Attorney, Agent, or Firm*—Dorsey & Whitney LLP

(57) ABSTRACT

The present invention provides a needle for injecting substances into food products, and a method of making such needles, such devices comprising a generally tubular body having a pointed end and a second end, an axial duct in the tubular body, openings located on the tubular body near the first and second ends, and an insert located in the axial duct between the second end of the tubular body and the opening located near the second end of the tubular body, whereby material is prevented from being deposited in the axial duct between the second end of the tubular body and the opening located near the second end of the tubular body.

20 Claims, 1 Drawing Sheet

NEEDLE FOR FOOD ITEM INJECTION

BACKGROUND

The present invention relates to equipment and methods for food processing. More particularly, the present invention relates to a needle for injecting substances into food products, including meat, a method of making such needles, and a method of using and cleaning such needles.

Typically, such needles comprise a tubular body having a first pointed end and a second end, an axial duct in the tubular body, and openings located along the length of the tubular body, at least near the first and second ends.

Precooking and prepackaging treatment of food is well known and is used for purposes such as flavoring or tenderizing. Equipment for injecting or infusing food for these or other purposes, including needles, is well known too. For example, U.S. Pat. No. 5,507,221 describes a needle for spray injecting brine into meat pieces. Such needles comprise a tubular body provided with an axial duct, with radial holes being distributed along the tubular body of the needle, such holes having a diameter which is apt to assure the spraying of brine under pressure. A holding end portion is connected to one end of the body, and is provided with a fastening zone, with a pointed tip being provided on the other end of the tubular body.

This type of injection needle needs to be frequently cleaned for both mechanical and health reasons. Injection substances for meat, such as brine solution, are passed through the needle and into the meat. These substances may be recycled, and can carry meat micro fibers with them through the needle which can eventually clog the radial holes. Also, bacteria can build up in needles containing residues of the injection substances and meat micro fibers. To clean the needles, air, or other fluid, such as water or other suitable cleaning agent, is circulated through the needle under pressure, using a blow gun or pump to dislodge any loose pieces, and force them out of the needle at the injection end through the radial holes. The fluid is blown into the needle at the entrance hole near the blunt end of the needle and is blown out the other holes. If any of the holes are blocked with pieces that will not exit, the needle is placed in a citric acid solution, typically 5 parts water to 1 part citric acid, for at least 24 hours. The needle is again blown out. If that procedure does not work, mechanical means might be required to clean the needle, such as a small wire or brush.

One problem with typical injection needles is that the needles are hollow from end to end, i.e., from the top extremity to the injection point. The hollow design does not allow for thorough sanitation throughout the needle, because current cleaning techniques do not allow for proper cleaning above the entrance hole located near the blunt end of the tubular body, which may be located up to 2½ from the top, or blunt end, of the needle and the top of the hollow duct. Anything in the hollow duct between the entrance hole and the blunt end of the needle is bypassed by the current cleaning methods, leaving residue and debris. In fact, debris may be pushed into that portion of the hollow duct by the current cleaning process. Once material builds up in that portion of the needle, citric acid may not reach or be corrosive enough to break down the materials. This debris can stay in that portion of the needle indefinitely, and can form a media for bacteria that can cause health hazards.

Thus, there is a need for an injection needle for food that doesn't allow residue and debris to remain in parts of the needle in locations that are not reached by current cleaning processes.

SUMMARY

The present invention provides a needle for injecting substances into food items, particularly meat, and a method of making the same, whereby debris and residue cannot be deposited or accumulated in portions of the needle.

The present invention accomplishes this task by providing an insert, which is inserted into the hollow portion, or axial duct, of the needle filling the area from the blunt end of the needle to the entrance aperture, consequently filling in that section of the hollow portion, so that no debris can be deposited in that area, and all debris and residue can be washed out of the needle, resulting in a clean and sanitary needle.

Other features and advantages of the present invention will become more fully apparent and understood with reference to the following description, the accompanying drawings, and the appended claims.

DETAILED DESCRIPTION

Figure 1:
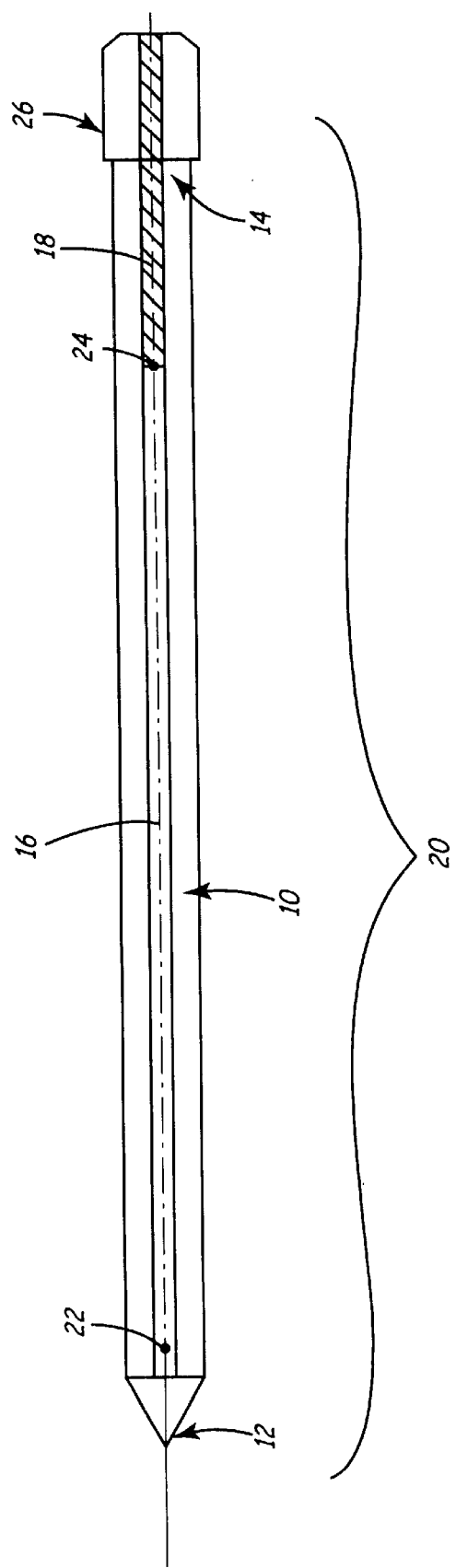
FIG. 1 is a side view of one embodiment of the present invention.

The accompanying Figures and this description depict and describe embodiments of the needle and method and apparatus of the present invention, and features and components thereof. With regard to means for fastening, mounting, attaching or connecting the components of the present invention to form the needle as a whole, unless specifically described otherwise, such means are intended to encompass conventional fasteners and fastening methods such as welding, friction fitting, including cold or freeze press fitting, adhesion, or deformation, if appropriate. Electrical connections, if any, for use in or during the process, may be made using appropriate electrical components and connection methods, including conventional components and connectors. Suitable computers, microprocessors and the like may be used in the method. Unless specifically otherwise disclosed or taught, materials for making components of the present invention are selected from appropriate materials such as metal, metallic alloys, fibers, plastics and the like, and appropriate manufacturing or production methods including casting, extruding, molding, and machining may be used.

Any references to front and back, right and left, top and bottom and upper and lower are intended for convenience of description, not to limit the present invention or its components to any one positional or spacial orientation.

Apparatus

FIG. 1 depicts one embodiment of the needle of the present invention. The needle 20 comprises an elongated, generally cylindrical tubular body 10 having two ends 12, 14, a generally central axial duct 16, at least one opening 22 located near a first, meat penetrating end 12 of the tubular body 10, at least one opening 24 located near the second end 14 of the tubular body 10, an insert 18 located in the axial duct 16 between the opening 24 and the second end 14 of the tubular body 10, and a cap member 26.

In one embodiment of the present invention, the tubular needle body 10 has two ends. The first end 12 of the tubular body 10 may be pointed, and the second end 14 may be blunt. The tubular body 10 has a central axis running longitudinally from the pointed end 12 to the blunt end 14, and may be composed of any rigid material capable of performing the task of injecting substances into meat. In one embodiment, the tubular body 10 may be an iron-chromium alloy containing at least 11.5% chromium, or non-degradable steel. It should be obvious to one skilled in the art, that other metals and alloys suitable for performing the functions of a tubular body may be used. The pointed end 12 serves the function of puncturing the meat so that the needle 20 may penetrate in order to inject substances, such as brine, into it. The blunt end 14 may be adapted suitably to connect the needle 20 to an injection machine.

A typical injection machine is described in U.S. Pat. No. 5,913,968, which patent is incorporated by reference herein, and includes at least one fluid chamber into which a fluid is fed under pressure, with several hollow needles, each connected with the fluid chamber via a valve device and movable in such a manner that they puncture the food, and a control instrument for operating the valve devices dependent on the needle movement. Other examples of this type of injection machine, includes such machines manufactured by Schröder. Such machines may be used on food processing lines to inject substances into food items.

Referring back to FIG. 1, an axial duct 16 is provided in the tubular body 10. The duct is a hollow bore that runs continuously through the tubular body 10, and is the pathway in the needle 20 through which an injected substance passes. The duct has a central axis that is generally coaxial with the axis of the tubular body 10. The diameter of the axial duct 16 should be sufficient to allow liquid substances or solutions, such as brine, to pass through it.

The tubular body 10 may have radial openings such as openings 22 and 24. The openings may have any shape, such as square, star-shaped, triangular, circular, etc. In one embodiment, the openings are circular. The openings 22, 24 may have a central axis that is generally perpendicular to the central axis of the axial duct 16. The openings go from the outside of the tubular body 10 to the axial duct 16. In one embodiment, there is at least one opening 22 near the pointed end 12 of the tubular body 10, and at least one opening 24 near the blunt end 14 of the tubular body 10. These apertures serve as the exit and entrance ports, respectively, for the injection substances. Other embodiments of the present invention may have more than one opening at either end, and may additionally have other openings along the tubular body 10. Multiple openings serve the function of introducing the injection substance into the food product to be treated at several points.

With continued reference to FIG. 1, the insert 18 may be a generally solid piece with an outside diameter very slightly smaller than the diameter of the axial duct 16. Preferably, the outside diameter of the insert 18 is just smaller than the diameter of the axial duct 16 in order to provide a tight fit, wherein the outside wall of the insert 18 is in substantially continuous contact with the inside wall of the duct 16. The insert 18 can be located in the axial duct 16 between the blunt end 14 of the tubular body 10, and the opening 24 located nearest the blunt end 14 of the tubular body 10. In one embodiment, the insert 18 has one end adjacent to the outside edge of the opening 24 near the blunt end 14. The purpose of the insert 18 is to prevent materials from being deposited between the opening 24 and the blunt end 14. This is accomplished by placing the insert so that one end is immediately adjacent to the edge of the opening 24. The insert 18 can be made of any substance that will not corrode, including, but not limited to plastic, non-degradable metal, carbon composites, or glass. In one embodiment, the insert 18 is non-degradable metal. In one embodiment, the insert 18 is entirely contained in the axial duct 16.

In one embodiment of the present invention, the end of the tubular body 10 can have a cap member 26. The cap member 26, or cap, can have any shape, and generally has an outside perimeter larger than the circumference of the tubular body 10. The cap 26 can be made of any material that can be attached to either the tubular body 10, the insert 18, or both, and can withstand an inscription process and connection to an injection machine. In one embodiment, the cap 26 is non-degradable steel. One purpose the cap serves is that it seals off the blunt end 14 of the tubular body 10, so that the insert 18 cannot come out. Secondly, the cap 26 may act as a holding end which can accept inscriptions, and third, the cap 26 may act as a mounting piece to attach the needle to an injection machine. In some embodiments the cap 26 may be integrated with the insert 18, in others with the needle, and in others it may be subsequently secured to the end of the needle following the press fitting of the insert 18 into the duct 16.

Method

To make an embodiment of the present invention, a needle comprising a tubular body 10 with two ends 12, 14 is provided. One end 12 may be pointed, and the second end 14 may be blunt. The tubular body 10 can be any material capable of withstanding a drilling or extrusion process, and able to withstand the meat injection process without corroding. Preferably, the tubular body 10 is non-degradable steel. An axial duct 16 is created in the tubular body 10 using a suitable method. The axial duct 16 has a diameter less than the outside diameter of the tubular body 10, and should be large enough to allow injection substances, such as brine, to pass through. The axial duct 16 can be created by any process known to make a bore through a substance such as metal. In one embodiment, the axial duct 16 is created by extruding non-degradable metal into a generally cylindrical, elongated form with a generally hollow interior, thus providing a tubular body 10 and an axial duct 16. If it is so desired, the ends of the extruded product may be fashioned by machining methods to be closed, blunt, and/or sharp. In one embodiment, the axial duct 16 starts at the blunt end 14 and does not extend all the way to and/or through the pointed end 12. However, in other embodiments, the axial duct 16 may pass all the way through the tubular body 10 and through the pointed end 12 creating an opening with a central axis generally coaxial with the axial duct 16 through which injection substances may pass. In one embodiment, the axial duct 16 may pass through the blunt end 14 of the tubular body 10.

In one embodiment, at least two openings 22, 24 are created in the side of the tubular body 10. The openings 22, 24 extend through the wall of the tubular body 10, communicating with the duct 16. The openings 22, 24 have a central axis which is generally perpendicular to the axial duct 16. A first opening 22 may be created near the pointed end 12 of the tubular body 10. The second opening 24 may be created near the blunt end 14 of the tubular opening 10. Other embodiments may have more openings in the specific areas of the tubular body 10, and may also have openings at one or more points along the side of the tubular body 10. The openings 22, 24 can be created by any suitable process that can create an opening in the side of a tubular body. In one embodiment of the present invention, the openings 22, 24 are created with a drill press, and are circular.

An insert 18 is then provided. The insert 18 can be a generally solid material that fits into the axial duct 16. The insert 18 may be constructed of any material that will not corrode and can withstand a process that will virtually attach it to the walls of the axial duct 16, such as friction fitting, welding, press-fitting, or adhesion. In one embodiment, the insert 18 is non-degradable steel. Preferably, the insert 18 is just small enough to fit very snugly into the axial duct 16. The insert 18 can then be placed in the axial duct 16, for example, by aligning it with the duct 16 and pressing it into the duct 16, so that it is positioned between the edge of the opening 24 located near the blunt end 14 of the tubular body 10, and the blunt end 14 of the tubular body 10. Preferably, the insert 18 is positioned so that the leading edge is adjacent to the edge of the opening 24. The insert 18 may be pressed into place sufficiently tightly, and/or set so that it cannot freely move throughout the axial duct 16. The insert may be set by any process, such as welding, adhesion, or friction fitting. In one embodiment, the insert 18 is set in the axial duct 16 by friction fitting. The insert 18 occludes the area of the needle between the second end of the tubular body 14 and the entrance opening to prevent material from being deposited in that area of the needle 20, where such material cannot be reached by cleaning methods, which can result in bacteria growth and unsanitary processing conditions. In one embodiment, the insert 18 is contained entirely within the axial duct 16.

In one embodiment, a cap 26 can be provided. The cap can be a separate piece, or may be attached to the end of the insert 18. The cap 26 can be constructed of any material suitable for attachment to the tubular body 10, and able to be connected to an injection machine. In one embodiment, the cap is non-degradable steel. The cap 26 can be attached to the blunt end 14 of the tubular body 10 by any suitable means, such as welding. In the case of the insert 18 and the cap 26 being one piece, the attachment of the insert 18 to the insides of the axial duct 16, can effectively attach the cap 26 to the tubular body 10, and the cap can also serve the function of controlling the extending of the insert 18 into the duct 16, and preventing the insert 18 from moving through the axial duct 16. In one embodiment, where the cap 26 is a separate piece from the insert 18, the cap 26 can be attached to the blunt end 14 of the tubular body 12 by welding.

In another embodiment of the invention, the tubular needle body 10 is provided with an axial duct 16 which does not extend to the blunt end 14 of the tubular body 10. The openings 22, 24 can then be created in the tubular body 10, with the opening 24 located near the blunt end 14 being created at the end of the axial duct 16. A cap 26 can be optionally attached to the blunt end 14 of the tubular body 10.

An alternative method of creating the present invention is to purchase generally elongated prefabricated needles made for injecting substances into meat. These needles are commercially available, and may be made to conform to purchasers' requirements, including, for example, the type of machine they are used on, the substance they are designed to inject or accommodate, the food item they are designed to treat and/or other design considerations. These needles typically have a tubular body 10 with two closed ends 12, 14, an axial duct 16, and openings 22, 24. In these needles, the axial duct 16 can extend past the opening 24 located near the blunt end 14, towards the blunt end 14 of the tubular body 10. To make the present invention with this starting material, the blunt end 14 of the tubular body 10 is detached at a point between the opening 24 and the blunt end 14. This can be done using a laser cutter, a saw, or any other type of cutting means suitable to cut small diameter tubular bodies. In one embodiment, the tubular body 10 is cut with a bandsaw. After the portion of the tubular body 10 has been detached, the axial duct 16 is open to the outside through the blunt end 14 of the tubular body 10. An insert 18 of appropriate length and diameter can then be inserted into the tubular body 10 through the axial duct 16 open at the blunt end 14. The insert 18 can be set in the duct 16 so that it is positioned adjacent to the edge of the opening 24. The insert 18 can then be attached to the walls of the axial duct 16, using an appropriate attachment method, including those set forth above. In one embodiment, the insert 18 can be friction fit in the axial duct 16. A cap 26 can then be mounted onto the blunt end 14, or the detached end of the needle may be reattached using conventional attachment methods, such as welding.

The present invention may be embodied in other specific forms without departing from the essential spirit or attributes thereof. It is desired that the described embodiments be considered in all respects as illustrative, not restrictive.

What is claimed is:

1. A needle for injecting substances into food products, the needle comprising:
    (a) a generally tubular body having:
        (i) a first end having a pointed tip;
        (ii) a second end;
        (iii) an axial duct in said tubular body, said axial duct extending out of the second end of the tubular body and having a first central axis;
        (iv) at least one first opening located near said first end of said tubular body, said at least one first opening having a second central axis generally perpendicular to said axial duct; and
        (v) at least one second opening located near said second end of said tubular body, said at least one second opening having a third central axis, generally perpendicular to said axial duct; and
    (b) an insert located in said axial duct generally at said second end of said tubular body between said at least one second opening, and said second end of said tubular body, whereby material is prevented from being deposited in said axial duct between said at least one second opening and said second end of said tubular body.

2. The needle of claim 1, wherein said at least one first opening and at least one second opening are circular.

3. The needle of claim 1, wherein said insert is stainless steel.

4. The needle of claim 1, wherein said tubular body is stainless steel.

5. The needle of claim 1, wherein at least one third opening is distributed along said tubular body.

6. The needle of claim 1, further comprising a cap located on the second end of the tubular body.

7. The needle of claim 1, whereby bacteria growth in the tubular body is substantially reduced.

8. The apparatus of claim 1, wherein the at least one first and second openings are square.

9. The apparatus of claim 1, wherein the at least one first and second openings are star-shaped.

10. The apparatus of claim 1, wherein the tubular body is an iron-chromium alloy containing at least 11.5% chromium.

11. The apparatus of claim 1, wherein the insert is an iron-chromium alloy containing at least 11.5% chromium.

12. A needle having a generally tubular body for injecting substances into food products, the needle comprising:
    a first end and second end, wherein said first end has a pointed tip and said second end is closed;
    an axial duct having a first central axis and extending from said first end of said tubular body to a planar surface of an insert within the axial duct, said planar surface being generally perpendicular to said first central axis;
    a first opening on said tubular body, located near said first end of said tubular body; and a second opening on said tubular body, located where said axial duct meets said closed second end of said tubular body, said second opening having a second central axis disposed generally parallel to said planar surface plane, whereby material is prevented from being deposited in said axial duct between said second opening and said second end of said tubular body.

13. The needle of claim 12, wherein said tubular body is stainless steel.

14. The needle of claim 12, wherein at least one third opening is distributed along said tubular body.

15. The needle of claim 12, wherein said first end of said tubular body is closed.

16. The needle of claim 12, wherein said first and second openings are circular.

17. The apparatus of claim 12, wherein the first and second openings are square.

18. The apparatus of claim 12, wherein the first and second openings are star-shaped.

19. The apparatus of claim 12, wherein the tubular body is an iron-chromium alloy containing at least 11.5% chromium.

20. A needle for injecting substances into food products, the needle comprising:

a generally tubular body, made of a stainless steel, the tubular body having:
  a first and second end;
  an axial duct in said tubular body, said axial duct having a first central axis and extending out of the second end of the tubular body;
  a pointed tip at said first end of said tubular body;
  at least one first opening located near said first end of said tubular body, said at least one first opening having a second central axis, said second central axis generally perpendicular to said axial duct; and
  at least one second opening on said tubular body located near said second end of said tubular body, said at least one second opening having a third central axis, generally perpendicular to said axial duct;

an insert, made of a stainless steel, having a first insert end and a second insert end, the insert located in said axial duct generally at said second end of said tubular body with the first insert end near the said at least one second opening, and the second insert end near the said second end of said tubular body, said first insert end defining a planar surface being generally perpendicular to said axial duct; and a cap, located on the second insert end, whereby material is prevented from being deposited in said axial duct between said at least one second opening and said second end of said tubular body.

* * * * *

UNITED STATES PATENT AND TRADEMARK OFFICE
CERTIFICATE OF CORRECTION

PATENT NO.     : 6,439,112 B1
DATED          : August 27, 2002
INVENTOR(S)    : Richard D. Pope It is certified that error appears in the above-identified patent and that said Letters Patent is hereby corrected as shown below:

<u>Column 1,</u>
Line 53, please delete "2½" and insert -- 2½" -- therefor.

<u>Column 7,</u>
Line 4, please delete "planar surface plane" and insert -- planar surface -- therefor.

Signed and Sealed this

Twenty-fourth Day of December, 2002

JAMES E. ROGAN
*Director of the United States Patent and Trademark Office*